(12) United States Patent
Kang et al.

(10) Patent No.: US 10,056,613 B2
(45) Date of Patent: Aug. 21, 2018

(54) NEGATIVE ELECTRODE ACTIVE MATERIAL AND NEGATIVE ELECTRODE FOR SECONDARY BATTERY COMPRISING THE SAME

(71) Applicant: LG CHEM, LTD., Seoul (KR)

(72) Inventors: Yoon Ah Kang, Daejeon (KR); Eun Kyung Kim, Daejeon (KR); Sun Young Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 34 days.

(21) Appl. No.: 15/343,721

(22) Filed: Nov. 4, 2016

(65) Prior Publication Data

US 2017/0133682 A1    May 11, 2017

(30) Foreign Application Priority Data

Nov. 5, 2015 (KR) .................. 10-2015-0155031

(51) Int. Cl.
| | |
|---|---|
| *H01M 4/587* | (2010.01) |
| *H01M 4/36* | (2006.01) |
| *H01M 10/0525* | (2010.01) |
| *H01M 4/02* | (2006.01) |

(52) U.S. Cl.
CPC .......... *H01M 4/587* (2013.01); *H01M 4/364* (2013.01); *H01M 10/0525* (2013.01); *H01M 2004/027* (2013.01)

(58) Field of Classification Search
CPC .. H01M 4/587; H01M 4/364; H01M 10/0525; H01M 2004/027
See application file for complete search history.

(56) References Cited

U.S. PATENT DOCUMENTS

| | | | |
|---|---|---|---|
| 2009/0286131 A1* | 11/2009 | Taniguchi | ........... H01M 8/0234 429/508 |
| 2016/0181612 A1* | 6/2016 | Lee | ........ H01M 4/587 429/231.8 |
| 2017/0373314 A1* | 12/2017 | Takeda | ................. H01M 4/583 |

FOREIGN PATENT DOCUMENTS

| | | |
|---|---|---|
| JP | 2004-158205 A | 6/2004 |
| KR | 10-2000-0037532 A | 7/2000 |
| KR | 10-2013-0136934 A | 12/2013 |
| KR | 10-2014-0085767 A | 7/2014 |
| WO | WO-2014024473 A1 * | 2/2014 ............ H01M 4/133 |

* cited by examiner

*Primary Examiner* — Laura Weiner
(74) *Attorney, Agent, or Firm* — Birch, Stewart, Kolasch & Birch, LLP (57) ABSTRACT

Provided are a negative electrode active material including spherical artificial graphite and natural flake graphite, wherein the spherical artificial graphite and the natural flake graphite are included in a weight ratio of 80:20 to 95:5, and a negative electrode for a lithium secondary battery including the same.

7 Claims, 2 Drawing Sheets

NEGATIVE ELECTRODE ACTIVE MATERIAL AND NEGATIVE ELECTRODE FOR SECONDARY BATTERY COMPRISING THE SAME

CROSS-REFERENCE TO RELATED APPLICATIONS

This application claims the benefit of Korean Patent Application No. 10-2015-0155031, filed on Nov. 5, 2015, in the Korean Intellectual Property Office, the disclosure of which is incorporated herein in its entirety by reference.

TECHNICAL FIELD

The present invention relates to a negative electrode active material and a negative electrode for a secondary battery including the same, and more particularly, to a negative electrode active material including spherical artificial graphite and natural flake graphite, and a high-density negative electrode for a secondary battery having improved rolling property and capacity characteristics by including the same.

BACKGROUND ART

In line with an increase in the price of energy sources due to the depletion of fossil fuels and amplification of interests in environmental pollution, environmentally-friendly alternative energy sources have become an indispensable factor for the future life.

In particular, the demand for secondary batteries as an environmentally-friendly alternative energy source has rapidly increased as the technology development and demand for mobile devices have increased.

Typically, lithium metal has been used as a negative electrode of a lithium secondary battery, but, since it has been known that a battery short circuit may occur due to the formation of dendrites and there is a risk of explosion due to the short circuit, the lithium metal is being replaced by a carbon-base compound capable of reversibly intercalating and deintercalating lithium ions as well as maintaining structural and electrical properties.

Since the carbon-based compound has a very low discharge voltage of about −3 V with respect to a hydrogen standard electrode potential and exhibits highly reversible charge and discharge behavior due to the uniaxial orientation of a graphene layer, the carbon-based compound exhibits excellent cycle life characteristics. Also, since the carbon-based compound may exhibit a potential that is almost similar to pure lithium metal, i.e., the electrode potential of the carbon-based compound is 0 V $Li/Li^+$ during lithium (Li)-ion charge, higher energy may be obtained when a battery is configured with an oxide-based positive electrode.

The carbon-based active material is classified into crystalline carbon and amorphous carbon, and the crystalline carbon may be classified into natural graphite and artificial graphite.

The natural graphite has excellent voltage flatness and high capacity close to theoretical capacity, but particles thereof have a highly crystalline plate shape. Thus, since the impregnation of an electrolyte solution is not facilitated due to the fact that the active material is compressed to high density when the particles are prepared as an electrode plate, high-rate charge and discharge characteristics may be reduced.

Since the artificial graphite has an excellent improvement effect on cycle life characteristics of the battery but has lower capacity than the natural graphite, a greater amount of the artificial graphite must be loaded to prepare a high-density electrode. In this case, since the artificial graphite has a low rolling property and has a high spring back effect, it is difficult to prepare a high-density electrode with targeted porosity. Thus, there is an urgent need to develop a method of preparing a high-density negative electrode for a secondary battery having improved rolling property and capacity characteristics by using a carbon-based active material.

DISCLOSURE OF THE INVENTION

Technical Problem

An aspect of the present invention provides a negative electrode active material which may improve a rolling property.

Another aspect of the present invention provides a high-density negative electrode for a secondary battery in which rolling property and capacity characteristics are improved by including the negative electrode active material.

Another aspect of the present invention provides a lithium secondary battery including the negative electrode for a secondary battery.

Technical Solution

According to an aspect of the present invention, there is provided a negative electrode active material including:

spherical artificial graphite and natural flake graphite, wherein the spherical artificial graphite and the natural flake graphite are included in a weight ratio of 80:20 to 95:5.

According to another aspect of the present invention, there is provided a negative electrode for a secondary battery including a current collector and a negative electrode material mixture layer coated on the current collector, wherein the negative electrode material mixture layer includes the negative electrode active material of the present invention, a conductive agent, and a binder.

According to another aspect of the present invention, there is provided a secondary battery including a negative electrode, a positive electrode, a separator disposed between the negative electrode and the positive electrode, and an electrolyte, wherein the negative electrode includes the negative electrode of the present invention.

Advantageous Effects

Since the present invention provides a negative electrode active material including spherical artificial graphite and natural flake graphite, a high-density negative electrode, in which targeted porosity and density are achieved by improving a rolling property, may be prepared. Also, a secondary battery having improved charge and discharge characteristics and capacity characteristics may be prepared by including the high-density negative electrode.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and there

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention aims at providing a negative electrode active material including spherical artificial graphite and natural flake graphite.

Also, the present invention provides a high-density negative electrode for a lithium secondary battery, in which rolling property and cycle life characteristics are improved by including the negative electrode active material, and a secondary battery including the negative electrode.

Specifically, an embodiment of the present invention provides a negative electrode active material including spherical artificial graphite and natural flake graphite, wherein the spherical artificial graphite and the natural flake graphite are included in a weight ratio of 80:20 to 95:5.

In a case in which the natural flake graphite is included in a weight ratio of less than about 5%, since desired rolling characteristics may not be obtained, a high-density negative electrode may be difficult to be achieved.

With respect to the natural flake graphite, an electrode swelling phenomenon in a direction perpendicular to the electrode is not only severe, but it is also unfavorable to the intercalation and deintercalation of lithium ions, in contrast to the spherical artificial graphite. In a case in which the natural flake graphite is excessively included in a weight ratio of greater than 20%, rate capability and output characteristics may be reduced. Thus, it is desirable to include a minimum amount of the natural flake graphite in such a manner that rolling characteristics and conductivity of the electrode may be improved, and, accordingly, the natural flake graphite may be included in a weight ratio of 20% or less, for example, 5% to 20%.

Also, the spherical artificial graphite denotes artificial graphite having an almost spherical shape, wherein all artificial graphite particles are not controlled to have a perfect spherical shape.

The spherical artificial graphite is derived from petroleum coke, wherein, after the petroleum coke is ground, corners are trimmed by mechanical grinding so that the petroleum coke is prepared to have a diameter of 10 μm to 25 μm, particularly 12 μm to 20 μm, and more particularly 12 μm to 16 μm, and the spherical artificial graphite may then be prepared by heat treating (graphitizing) the petroleum coke at a temperature of 2,800° C. to 3,000° C.

An average particle diameter ($D_{50}$) of the graphitized spherical artificial graphite may be in a range of 10 μm to 25 μm, particularly 12 μm to 20 μm, and more particularly 12 μm to 16 μm. In a case in which the average particle diameter ($D_{50}$) of the artificial graphite is less than 10 μm, since the graphitization is not facilitated, capacity may be low and a rolling property may be reduced. Also, in a case in which the average particle diameter ($D_{50}$) of the artificial graphite is greater than 30 μm, the deintercalation and intercalation of lithium (Li) ions may be reduced as an average particle diameter of negative electrode active material particles is increased.

Furthermore, the natural flake graphite is graphite having excellent voltage flatness and high capacity close to theoretical capacity, wherein it is desirable to use the natural flake graphite after performing a pretreatment process in which the natural flake graphite is graphitized at a temperature of 2,500° C. or more.

Since chemical impurities included in the natural graphite are removed by the pretreatment process, a side reaction with an electrolyte solution may be prevented and cycle life characteristics of the negative electrode active material may be improved by preventing a decrease in electrical conductivity of the negative electrode active material.

Also, in the negative electrode active material of the present invention, a ratio of the average particle diameter ($D_{50}$) of the spherical artificial graphite to a maximum diameter of the natural flake graphite may be in a range of 1:0.4 to 1:1.5, particularly 1:0.6 to 1:1, and more particularly 1:0.8.

In a case in which an average particle diameter of the natural flake graphite is smaller than that of the spherical artificial graphite, better performance may be obtained.

In a case in which the ratio of the average particle diameter ($D_{50}$) of the spherical artificial graphite to the particle diameter of the natural flake graphite is included within the above range, packing density of the negative electrode may be improved, and consequently, the side reaction with the electrolyte solution may be prevented by decreasing a specific surface area of the negative electrode active material.

In a case in which the ratio of the average particle diameter ($D_{50}$) of the spherical artificial graphite to the particle diameter of the natural flake graphite is outside the above range, for example, in a case in which the ratio of the maximum diameter of the natural flake graphite to the average particle diameter ($D_{50}$) of the spherical artificial graphite is greater than 1.5, since the particle diameter of the natural flake graphite is greater than that of the spherical artificial graphite, the natural flake graphite is difficult to be uniformly distributed between the spherical artificial graphite particles, and the rate capability and output characteristics may be reduced because diffusion paths of the Li ions are increased.

In contrast, in a case in which the ratio of the maximum diameter of the natural flake graphite to the average particle diameter ($D_{50}$) of the spherical artificial graphite is less than 0.4, since an increase in the rolling property is insignificant and a specific surface area of the natural flake graphite is increased, initial efficiency may be reduced and high-temperature performance may be degraded.

An average particle diameter ($D_{50}$) of the negative electrode active material of the present invention may be about 28 μm or less and, for example, may be in a range of about 11 μm to about 16 μm. Also, with respect to capacity of the negative electrode active material, the capacity of about 341 mAh/g to 357 mAh/g may be achieved according to a ratio in consideration of capacity (340 mAh/g to 355 mAh/g) of the spherical artificial graphite and capacity (360 mAh/g to 365 mAh/g) of the natural flake graphite.

Furthermore, in the negative electrode active material of the present invention, a carbon coating layer may be further formed on a surface of the negative electrode active material, if necessary.

The carbon coating layer may be formed by a method in which a heat treatment is performed while mixing the negative electrode active material and a carbon precursor. A typical example of the carbon precursor may be at least one carbon-containing gas selected from the group consisting of methane gas, ethane gas, propane gas, ethylene gas, and acetylene gas.

Also, the carbon coating layer may include a crystalline or amorphous carbon coating layer. Solid-phase or liquid-phase mixing of inorganic particles or inorganic oxide particles and crystalline carbon are performed and the crystalline carbon coating layer may then be formed by performing a heat treatment. Surfaces of inorganic particles or inorganic oxide particles are coated with an amorphous carbon precursor, and the amorphous carbon coating layer may then be formed by using a method of carbonization through a heat treatment.

Typical examples of the crystalline carbon may be graphene and graphite. Also, typical examples of the amorphous carbon precursor may be resins, such as a phenol resin, a naphthalene resin, a polyvinyl alcohol resin, an urethane resin, a polyimide resin, a furan resin, a cellulose resin, an epoxy resin, and a polystyrene resin, coal-based pitch, tar, or low molecular weight heavy oil.

The carbon coating layer may be included in an amount of 0.05 wt % to 5 wt % based on a total weight of the negative electrode active material.

In a case in which the amount of the carbon coating layer is greater than 5 wt %, since a thickness of the carbon coating layer is excessively increased, the intercalation and deintercalation of the lithium ions may be interrupted.

Also, an embodiment of the present invention provides a negative electrode for a secondary battery including a current collector and a negative electrode material mixture layer coated on the current collector, wherein the negative electrode material mixture layer includes the negative electrode active material of the present invention, a conductive agent, and a binder.

Figure 1:
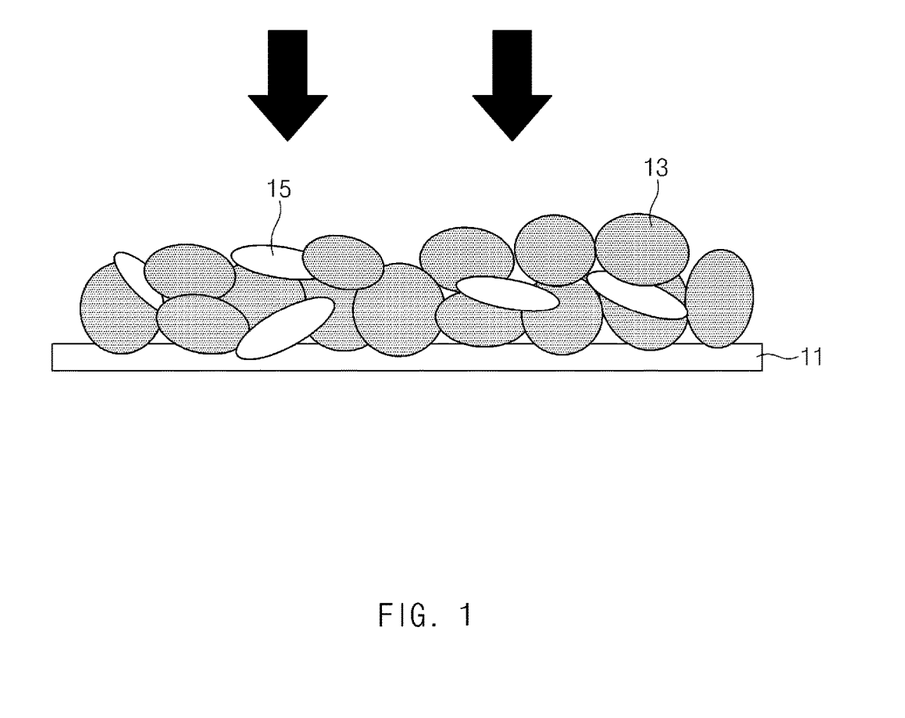
- FIG. 1 is a cross-sectional view schematically illustrating a negative electrode prepared in Example 1 of the present invention.

As illustrated in FIG. 1, in the negative electrode of the present invention, a negative electrode material mixture layer including a negative electrode active material, which includes natural flake graphite 15 as well as spherical artificial graphite 13, is formed on a current collector 11. As a result, since the natural flake graphite, while being disposed between spherical artificial graphite particles, acts as a buffer to improve the rolling property during a rolling process for the preparation of the negative electrode, density of the negative electrode material mixture layer may be improved. Thus, an electrode density of the negative electrode of the present invention may be 1.60 g/cc or more and, for example, may be in a range of 1.64 g/cc or more to 1.80 g/cc or less. In addition, in a case in which the electrode density is increased to greater than 1.80 g/cc, since the active material may be broken or porosity in the electrode may be reduced, an electrolyte impregnating property may be deteriorated and the movement of the Li ions may be difficult. Thus, battery performance may be degraded.

The negative electrode of the present invention may be prepared by a typical method known in the art. For example, the negative electrode active material of the present invention, a binder, a conductive agent, and a solvent are mixed together and stirred to prepare a negative electrode material mixture, and a negative electrode collector is then coated with the mixture and pressed. Thereafter, the negative electrode may be prepared by drying the coated collector.

The negative electrode collector generally has a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, like a positive electrode collector, the negative electrode collector may have fine surface roughness to improve bonding strength with the negative electrode active material. The negative electrode collector may have various shapes such as a film, a sheet, a foil, a net, a porous body, a foam body, a non-woven fabric body, and the like.

Furthermore, the negative electrode active material may further include at least one negative electrode active material selected from the group consisting of lithium-containing titanium composite oxide (LTO); metals (Me) such as silicon (Si), tin (Sn), lithium (Li), zinc (Zn), magnesium (Mg), cadmium (Cd), cerium (Ce), nickel (Ni), or iron (Fe); alloys composed of the metals (Me); oxides of the metals (Me); and composites of the metals (Me) and carbon, in addition to the negative electrode active material of the present invention.

The negative electrode active material may be included in an amount of 80 wt % to 99 wt % based on a total weight of the negative electrode material mixture.

The binder is a component that assists in the binding between the conductive agent, the active material, and the current collector, wherein the binder is commonly added in an amount of 1 wt % to 30 wt % based on the total weight of the negative electrode material mixture.

Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is a component for further improving the conductivity of the negative electrode active material, wherein the conductive agent may be added in an amount of 1 wt % to 20 wt % based on the total weight of the negative electrode material mixture.

Any conductive agent may be used without particular limitation so long as it has suitable conductivity without causing adverse chemical changes in the battery, and, for example, a conductive material such as: a carbon-based material such as carbon black (Super P), acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include water or an organic solvent, such as N-methyl-2-pyrrolidone (NMP), and may be used in an amount such that desirable viscosity is obtained when the negative electrode active material as well as selectively the binder and the conductive agent are included. For example, the solvent may be included so that a concentration of solid content including the negative electrode active material as well as selectively the binder and the conductive agent is in a range of 40 wt % to 70 wt %, for example, 45 wt % to 55 wt %.

With respect to a typical negative electrode which includes a negative electrode active material only containing artificial graphite, since the rolling property is low, it is not only difficult to prepare a high-density negative electrode with targeted porosity during the rolling process, but the negative electrode active material may also be damaged or broken when a strong pressure is applied to prepare an electrode with a targeted thickness. However, as described above, with respect to the negative electrode prepared according to the embodiment of the present invention, since the rolling property is increased by including the negative electrode active material which includes the spherical artificial graphite and the natural flake graphite having different particle strengths and particle sizes at a predetermined ratio, a high-density negative electrode with targeted porosity may be easily prepared even at a lower pressure.

Furthermore, an embodiment of the present invention provides a lithium secondary battery.

Specifically, the lithium secondary battery of the present invention may be prepared by injecting a non-aqueous electrolyte solution into an electrode assembly which is composed of a positive electrode, the negative electrode, and a separator disposed between the positive electrode and the negative electrode. In this case, those typically used in the preparation of the lithium secondary battery may all be used as the positive electrode, the negative electrode, and the separator which constitute the electrode assembly.

In this case, the positive electrode may be prepared by coating a positive electrode material mixture including a positive electrode active material, a binder, a conductive agent, and a solvent on a positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.)

lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of the capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.). In consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of the positive electrode material mixture.

The binder is a component that assists in the binding between the active material and the conductive agent and in the binding with the current collector, wherein the binder is commonly added in an amount of 1 wt % to 30 wt % based on the total weight of the positive electrode material mixture. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the positive electrode material mixture.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of solid content including the positive electrode active material as well as selectively the binder and the conductive agent is in a range of 50 wt % to 95 wt %, for example, 70 wt % to 90 wt %.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

Examples of the electrolyte solution may be an organic electrolyte solution, in which a lithium salt is dissolved in a non-aqueous solvent, or a polymer electrolyte solution.

Examples of the non-aqueous solvent constituting the organic electrolyte solution may be non-aqueous solvents, such as propylene carbonate, ethylene carbonate, butylene carbonate, benzonitrile, acetonitrile, tetrahydrofuran, 2-methyl tetrahydrofuran, γ-butyrolactone, dioxolane, 4-methyl dioxolane, N,N-dimethylformamide, dimethylacetoamide, dimethyl sulfoxide, dioxane, 1,2-dimethoxyethane, sulfolane, dichloroethane, chlorobenzene, nitrobenzene, dimethyl carbonate, methyl ethyl carbonate, diethyl carbonate, methyl propyl carbonate, methyl isopropyl carbonate, ethyl butyl carbonate, dipropyl carbonate, diisopropyl carbonate, dibutyl carbonate, diethylene glycol, and dimethyl ether, or a mixed solvent of two or more thereof, or a solvent typically known as a solvent for a lithium secondary battery. In particular, a solvent may be used, in which one of dimethyl carbonate, methyl ethyl carbonate, and diethyl carbonate is mixed with a solvent including one of propylene carbonate, ethylene carbonate, and butyl carbonate.

The lithium salt may be used without limitation so long as it is typically used in an electrolyte solution for a lithium secondary battery. For example, the lithium salt may include $Li^+$ as a cation, and may include any one selected from the group consisting of $F^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in a mixture of two or more thereof, if necessary.

Examples of the polymer electrolyte solution may include the organic electrolyte solution and (co)polymers, such as polyethylene oxide, polypropylene oxide, polyacetonitrile, polyvinylidene fluoride, polymethacrylate, and polymethylmethacrylate, which have an excellent swelling property with respect to the organic electrolyte solution.

Since the secondary battery according to the present invention may exhibit high energy density, high output characteristics, improved safety, and stability, the secondary battery may be particularly suitable for a battery constituting a medium and large sized battery module. Therefore, the present invention may also provide a medium and large sized battery module including the secondary battery as a unit cell.

The medium and large sized battery module may be suitable for power sources requiring high output and high capacity, such as an electric vehicle, a hybrid electric vehicle, and a power storage device.

Hereinafter, the present invention will be described according to examples and experimental examples. However, the following examples are merely presented to exemplify the present invention, and the scope of the present invention is not limited thereto.

EXAMPLES

Example 1

(Negative Electrode Active Material Preparation)

Powder having an average particle diameter ($D_{50}$) of 15 μm was obtained from petroleum coke by using a jet mill. Mechanical grinding was performed to trim corners of the powder, and spherical artificial graphite particles having an average particle diameter ($D_{50}$) of 13 μm were then prepared by heat treating (graphitizing) the powder at 3,000° C. for 20 hours in an inert ($N_2$) gas atmosphere.

Impurities were removed by heat treating natural flake graphite having a maximum diameter of 10 μm at 2,800° C. for 20 hours.

The spherical artificial graphite 13 and the natural flake graphite 15 were mixed in a weight ratio of 95:5 to prepare a negative electrode active material (average particle diameter ($D_{50}$) of 12.9 μm).

(Negative Electrode Preparation)

The prepared negative electrode active material, a conductive agent (super-P), carboxy cellulose as a thickener, and a styrene-butadiene rubber as a binder were mixed in a weight (%) ratio of 95.8:1:1:2.2 and then added to water to prepare a negative electrode material mixture (solid content of 50 wt %).

A negative electrode collector (Cu thin film) 11 was coated with the negative electrode material mixture, vacuum-dried at about 130° C. for 10 hours, and then subjected to a rolling process with a roll press to prepare a negative electrode plate (see FIG. 1).

The rolling process was performed by using a roll pressing machine equipped with two upper rolls and a lower roll, and, in this case, a non-heating roll-type straight roller having a strength of 0.4 S or less and a hardness of HrC60 was used. A pressing speed during the rolling process was in a range of 0.3 m/s to 2 m/s.

A gap between the two upper rolls and the lower roll during the rolling process was set to be 60% of the targeted negative electrode thickness, changes in density and porosity of a negative electrode material mixture layer were then measured for the corresponding gap while reducing the gap by 20%, and the results thereof are presented in Table 1 below.

Example 2

A negative electrode active material (average particle diameter ($D_{50}$) of 12.4 μm) and a negative electrode plate including the same were prepared in the same manner as in Example 1 except that the spherical artificial graphite and the natural flake graphite were mixed in a weight ratio of 80:20 in the preparation of the negative electrode active material in Example 1.

Changes in density and porosity of a negative electrode material mixture layer were measured in the same manner as in Example 1, and the results thereof are presented in Table 1 below.

Example 3

A negative electrode active material (average particle diameter ($D_{50}$) of 12.6 μm) and a negative electrode plate including the same were prepared in the same manner as in Example 1 except that spherical artificial graphite, in which mesocarbon microbeads having a particle diameter ratio of 1:0.85 were graphitized, and the natural flake graphite were mixed in a weight ratio of 80:20 in the preparation of the negative electrode active material in Example 1.

Changes in density and porosity of a negative electrode material mixture layer were measured in the same manner as in Example 1, and the results thereof are presented in Table 1 below.

Comparative Example 1

A negative electrode active material (average particle diameter ($D_{50}$) of 11.2 μm) and a negative electrode plate including the same were prepared in the same manner as in Example 1 except that the spherical artificial graphite and the natural flake graphite were mixed in a weight ratio of 40:60 in the preparation of the negative electrode active material in Example 1.

Changes in density and porosity of a negative electrode material mixture layer were measured in the same manner as in Example 1, and the results thereof are presented in Table 1 below.

Comparative Example 2

A negative electrode active material (average particle diameter ($D_{50}$) of 10.5 μm) and a negative electrode plate including the same were prepared in the same manner as in Example 1 except that the spherical artificial graphite and the natural flake graphite were mixed in a weight ratio of 15:85 in the preparation of the negative electrode active material in Example 1.

Changes in density and porosity of a negative electrode material mixture layer were measured in the same manner as in Example 1, and the results thereof are presented in Table 1 below.

Comparative Example 3

A negative electrode active material (average particle diameter ($D_{50}$) of 12.3 μm) and a negative electrode plate including the same were prepared in the same manner as in Example 1 except that the spherical artificial graphite and the natural flake graphite were mixed in a weight ratio of 75:25 in the preparation of the negative electrode active material in Example 1.

Changes in density and porosity of a negative electrode material mixture layer were measured in the same manner as in Example 1, and the results thereof are presented in Table 1 below.

Comparative Example 4

A negative electrode active material (average particle diameter ($D_{50}$) of 13.0 μm) and a negative electrode plate including the same were prepared in the same manner as in Example 1 except that the spherical artificial graphite was only included in the preparation of the negative electrode active material in Example 1.

Changes in density and porosity of a negative electrode material mixture layer were measured in the same manner as in Example 1, and the results thereof are presented in Table 1 below.

TABLE 1

|  |  | Gap 60% | Gap 40% | Gap 20% | Gap 0% | Gap −20% |
|---|---|---|---|---|---|---|
| Example 1 | Porosity (%) | 37 | 30 | 27 | 25 | 24 |
|  | Density (g/cc) | 1.36 | 1.51 | 1.57 | 1.62 | 1.64 |

TABLE 1-continued

|  |  | Gap 60% | Gap 40% | Gap 20% | Gap 0% | Gap −20% |
|---|---|---|---|---|---|---|
| Example 2 | Porosity (%) | 36 | 27 | 24 | 21 | 18 |
|  | Density (g/cc) | 1.38 | 1.57 | 1.64 | 1.70 | 1.77 |
| Example 3 | Porosity (%) | 37 | 29 | 26 | 22 | 20 |
|  | Density (g/cc) | 1.36 | 1.53 | 1.60 | 1.68 | 1.72 |
| Comparative Example 1 | Porosity (%) | 34 | 25 | 21 | 18 | 12 |
|  | Density (g/cc) | 1.42 | 1.62 | 1.70 | 1.77 | 1.90 |
| Comparative Example 2 | Porosity (%) | 31 | 21 | 15 | 10 | 7 |
|  | Density (g/cc) | 1.49 | 1.70 | 1.83 | 1.94 | 2.00 |
| Comparative Example 3 | Porosity (%) | 36 | 26 | 23 | 21 | 16 |
|  | Density (g/cc) | 1.38 | 1.60 | 1.66 | 1.70 | 1.81 |
| Comparative Example 4 | Porosity (%) | 38 | 31 | 29 | 28 | 28 |
|  | Density (g/cc) | 1.34 | 1.49 | 1.53 | 1.55 | 1.55 |

As illustrated in Table 1, with respect to the negative electrode plates of Examples 1 to 3, since the rolling property was increased by mixing the spherical artificial graphite having a poor rolling property and the natural flake graphite having an excellent rolling property, high-density negative electrodes having an electrode density of 1.64 g/cc or more (porosity of 18% or more) may be prepared.

In contrast, with respect to the negative electrode plates of Comparative Examples 1 to 3 in which the spherical artificial graphite was included in an amount of 80 wt % or less, electrode densities may be increased in comparison to those of the negative electrode plates of Examples 1 to 3 as the rolling process proceeded, but, since the natural flake graphite was excessively included, a swelling phenomenon may be increased or rate capability (see the following Table 2) and cycle life performance may be reduced.

Also, with respect to the negative electrode active material of Comparative Example 4 only including the spherical artificial graphite, since it was difficult to increase the electrode density to 1.6 g/cc or more even if the rolling was performed while reducing the gap, the thickness of the electrode may be increased in comparison to those of the negative electrode plates of Examples 1 to 3 in order to achieve the same capacity. Accordingly, energy density of the lithium secondary battery is reduced.

Example 4

(Positive Electrode Preparation)

97.2 parts by weight of a positive electrode active material ($LiCoO_2$), 1.5 parts by weight of a binder (polyvinylidene fluoride), and 1.3 parts by weight of a conductive agent (Super-P) were dispersed in N-methylpyrrolidone to prepare a positive electrode active material mixture. An aluminum current collector was coated with the positive electrode material mixture and then roll-pressed to prepare a positive electrode plate (density: 3.4 g/cc).

(Negative Electrode Preparation)

A negative electrode plate having a density of 1.55 g/cc was prepared by adjusting rolling conditions in the preparation of the negative electrode plate in Example 1.

That is, since it was difficult to increase the density of Comparative Example 4 (electrode including 100% spherical artificial graphite) to 1.55 g/cc or more, the density of the negative electrode plate was adjusted to be 1.55 g/cc in order to compare cycle life and rate characteristics at the same electrode density.

(Secondary Battery Preparation)

An electrode assembly was prepared by disposing a polyethylene separator between the prepared negative electrode plate and positive electrode plate, and a secondary battery was then prepared by putting the electrode assembly in a battery case and injecting an electrolyte solution thereinto. In this case, the electrolyte solution, in which 1.0 M LiPF$_6$ was dissolved in a mixed solution of ethylene carbonate/ethylmethyl carbonate/diethyl carbonate (volume ratio of 1/2/1), was used.

Example 5

(Negative Electrode Preparation)

A negative electrode plate having a density of 1.55 g/cc was prepared by adjusting rolling conditions in the preparation of the negative electrode plate of Example 2.

(Secondary Battery Preparation)

A secondary battery was prepared in the same manner as in Example 4 except that the prepared negative electrode plate was used.

Example 6

(Negative Electrode Preparation)

A negative electrode plate having a density of 1.55 g/cc was prepared by adjusting rolling conditions in the preparation of the negative electrode plate of Example 3.

(Secondary Battery Preparation)

A secondary battery was prepared in the same manner as in Example 4 except that the prepared negative electrode plate was used.

Comparative Example 5

(Negative Electrode Preparation)

A negative electrode plate having a density of 1.55 g/cc was prepared by adjusting rolling conditions in the preparation of the negative electrode plate of Comparative Example 1.

(Secondary Battery Preparation)

A secondary battery was prepared in the same manner as in Example 4 except that the prepared negative electrode plate was used.

Comparative Example 6

(Negative Electrode Preparation)

A negative electrode plate having a density of 1.55 g/cc was prepared by adjusting rolling conditions in the preparation of the negative electrode plate of Comparative Example 2.

(Secondary Battery Preparation)

A secondary battery was prepared in the same manner as in Example 4 except that the prepared negative electrode plate was used.

Comparative Example 7

(Negative Electrode Preparation)

A negative electrode plate having a density of 1.55 g/cc was prepared by adjusting rolling conditions in the preparation of the negative electrode plate of Comparative Example 3.

(Secondary Battery Preparation)

A secondary battery was prepared in the same manner as in Example 4 except that the prepared negative electrode plate was used.

Comparative Example 8

(Negative Electrode Preparation)

A negative electrode plate having a density of 1.55 g/cc was prepared by adjusting rolling conditions in the preparation of the negative electrode plate of Comparative Example 4.

(Secondary Battery Preparation)

A secondary battery was prepared in the same manner as in Example 4 except that the prepared negative electrode plate was used.

Experimental Examples

Experimental Example 1

Figure 2:
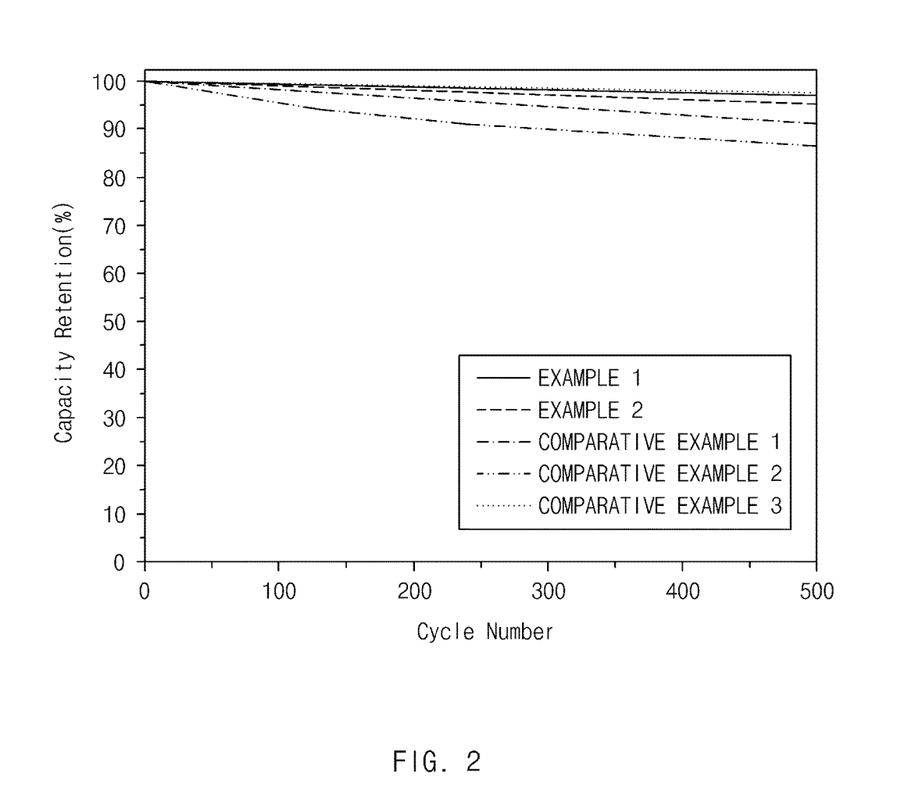
FIG. 2 is a graph illustrating cycle life characteristics of lithium secondary batteries according to Experimental Example 1 of the present invention.

Changes in battery capacity were measured while charge and discharge of the secondary batteries prepared in Examples 4 and 5 and the secondary batteries prepared in Comparative Examples 5, 6, and 8 were repeated 50 times, and cycle life characteristics results are presented in FIG. 2.

As illustrated in FIG. 2, it may be understood that degradation of the cycle life characteristics of the secondary batteries of Comparative Examples 5 and 6 occurred as the amount of the spherical artificial graphite was decreased and the amount of the natural flake graphite, which had relatively large swelling and was unfavorable to the intercalation and deintercalation of Li, was increased.

In contrast, with respect to the secondary batteries of Examples 4 and 5 in which the amount of the spherical artificial graphite was large, it may be understood that the degradation of the cycle life characteristics did not occur and the battery capacity was also improved.

With respect to the secondary battery of Comparative Example 8 including the negative electrode active material of Comparative Example 4 which includes 100% spherical artificial graphite, it may be understood that, since the amount of the artificial graphite was large, cycle life characteristics were similar to those of Examples 4 and 5.

However, since the secondary battery of Comparative Example 8 had a critical density of about 1.55 g/cc and may not be rolled to more than the critical density, a high-density electrode may not be achieved. Thus, since the thickness was increased in comparison to those of the secondary batteries of Examples 4 and 5 in order to obtain the same capacity, it was not suitable for the realization of a high capacity battery requiring a high density of 1.60 g/cc or more.

Experimental Example 2

The secondary batteries prepared in Examples 4 to 6 and the secondary batteries prepared in Comparative Examples 5 to 8 were charged at a 0.2 C rate to 4.2 V under a constant current-constant voltage (CC-CV) condition and then discharged at 0.2 C to a voltage of 2.5 V to verify 0.2 C discharge capacity. Thereafter, the batteries were again charged at 0.2 C to 4.2 V under a CC-CV condition, were then discharged at 3 C to a voltage of 2.5 V to verify 3 C discharge capacity, and capacity retention at a rate of 3 C/0.2 C was compared. The results thereof are presented in Table 2 below.

TABLE 2

| | Negative electrode active material composition (spherical artificial graphite/natural flake graphite) | Discharge rate performance comparison Capacity retention % (3 C/0.2 C) |
|---|---|---|
| Example 4 | 95:5 | 64.5 |
| Example 5 | 80:20 | 63.3 |
| Example 6 | 80:20 | 52.5 |

TABLE 2-continued

| | Negative electrode active material composition (spherical artificial graphite/natural flake graphite) | Discharge rate performance comparison Capacity retention % (3 C/0.2 C) |
|---|---|---|
| Comparative Example 5 | 40:60 | 43.6 |
| Comparative Example 6 | 15:85 | 27.4 |
| Comparative Example 7 | 75:25 | 59.8 |
| Comparative Example 8 | 100:0 | 63.1 |

As illustrated in Table 2, with respect to the secondary batteries of Comparative Examples 5 to 7 including the negative electrode active materials in which 20% or more of the natural flake graphite, which was unfavorable to the intercalation and deintercalation of Li ions, was mixed, it may be understood that, since the intercalation and deintercalation of Li ions were reduced as charge and discharge cycles were repeated, high C-rate (3 C) performance was degraded in comparison to those of Examples 4 and 5.

Also, with respect to the secondary battery of Comparative Example 8 including the negative electrode active material of Comparative Example 4 which includes 100% spherical artificial graphite, there was no significant difference in rate capability in comparison to the secondary batteries prepared in Examples 4 and 5, but, as described above, since the thickness of the secondary battery may be increased to obtain a high-density electrode, it was not suitable for the realization of a high capacity battery.

With respect to the secondary battery of Example 6 prepared by using the negative electrode active material of Example 3 including the spherical artificial graphite in which mesocarbon microbeads were graphitized, it may be understood that rate capability was lower than those of the secondary batteries prepared in Examples 4 and 5.

From these results, it is considered that, in order to prepared a secondary battery having improved charge and discharge characteristics and capacity characteristics, the spherical artificial graphite prepared based on petroleum coke was a more suitable material than the spherical artificial graphite, in which mesocarbon microbeads were graphitized, in consideration of the battery performance.

The above descriptions are merely exemplary embodiments for implementing the negative electrode active material according to the present invention, the preparation method thereof, and the secondary battery including the negative electrode active material, so that the present invention is not limited thereto. The true scope of the present invention should be defined to the extent that those skilled in the art can make various modifications and changes thereto without departing from the scope of the invention, as defined by the appended claims.

The invention claimed is:

1. A negative electrode for a secondary battery, the negative electrode comprising:
a current collector; and
a negative electrode material mixture layer coated on the current collector,
wherein the negative electrode material mixture layer comprises a negative electrode active material, a conductive agent, and a binder,
wherein the negative electrode active material comprises:
spherical artificial graphite; and
natural flake graphite,
wherein the spherical artificial graphite and the natural flake graphite are included in a weight ratio of 80:20 to 95:5,
wherein the electrode density of the negative electrode for a secondary battery is in a range of 1.64 g/cc to 1.80 g/cc,
wherein a ratio of the average particle diameter ($D_{50}$) of the spherical artificial graphite to a maximum diameter of the natural flake graphite is in a range of 1:0.4 to 1:1.5, and
wherein the average particle diameter ($D_{50}$) of the negative electrode active material is in a range of 11 μm to 16 μm.

2. The negative electrode for a secondary battery of claim 1, wherein an average particle diameter ($D_{50}$) of the spherical artificial graphite is in a range of 12 μm to 16 μm.

3. The negative electrode for a secondary battery of claim 1, wherein a ratio of the average particle diameter ($D_{50}$) of the spherical artificial graphite to a maximum diameter of the natural flake graphite is in a range of 1:0.6 to 1:1.

4. The negative electrode for a secondary battery of claim 1, wherein a ratio of the average particle diameter ($D_{50}$) of the spherical artificial graphite to a maximum diameter of the natural flake graphite is 1:0.8.

5. The negative electrode for a secondary battery of claim 1, wherein the spherical artificial graphite is derived from petroleum coke.

6. The negative electrode active material of claim 1, wherein the spherical artificial graphite and the natural flake graphite are included in a weight ratio of greater than 80:20 and less than or equal to 95:5.

7. A secondary battery comprising:
a negative electrode;
a positive electrode;
a separator disposed between the negative electrode and the positive electrode; and
an electrolyte,
wherein the negative electrode comprises the negative electrode of claim 1.

* * * * *